(12) United States Patent
Takori et al.

(10) Patent No.: US 12,441,233 B2
(45) Date of Patent: Oct. 14, 2025

(54) VEHICLE HEADLIGHT DEVICE HAVING A LOW BEAM. A HIGH BEAM AND PATTERN EMITTER THAT EMITS LIGHT INTO A LIGHT DISTRIBUTION REGION HAVING BRIGHT AND DARK REGIONS

(71) Applicant: HONDA MOTOR CO., LTD., Tokyo (JP)

(72) Inventors: Masayoshi Takori, Tokyo (JP); Tadahiro Matori, Tokyo (JP); Shingo Nakayama, Tokyo (JP); Yuji Tsuchiya, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/896,922

(22) Filed: Sep. 26, 2024

(65) Prior Publication Data

US 2025/0108752 A1 Apr. 3, 2025

(30) Foreign Application Priority Data

Sep. 29, 2023 (JP) .................................. 2023-170517

(51) Int. Cl.
*B60Q 1/24* (2006.01)
*B60Q 1/00* (2006.01)
*F21S 41/00* (2018.01)
*F21W 102/17* (2018.01)

(52) U.S. Cl.
CPC ........... *B60Q 1/247* (2022.05); *B60Q 1/0041* (2013.01); *F21S 41/00* (2018.01); *F21W 2102/17* (2018.01)

(58) Field of Classification Search
CPC ... F21W 2102/17; B60Q 1/247; B60Q 1/0041
See application file for complete search history.

(56) References Cited

U.S. PATENT DOCUMENTS

| 2019/0113197 A1 | 4/2019 | Kamiya et al. |
| 2019/0315269 A1 | 10/2019 | Kishigami et al. |
| 2022/0299181 A1 | 9/2022 | Takori et al. |

FOREIGN PATENT DOCUMENTS

| JP | 2019182275 A | 10/2019 |
| JP | 2022143872 A | 10/2022 |
| WO | 2017164328 A1 | 9/2017 |
| WO | 2021006217 A1 | 1/2021 |

OTHER PUBLICATIONS

Notification of Reasons for Refusal issued Jun. 3, 2025 in the JP Patent Application No. 2023-170517.

*Primary Examiner* — Robert J May
(74) *Attorney, Agent, or Firm* — CKC & Partners Co., LLC (57) ABSTRACT

A vehicle headlight device comprising: a low-beam lamp and a high-beam lamp that illuminates a first light distribution region that is in front of the vehicle with light; and a patterned-light emitter that illuminates a second light distribution region with light in an illumination pattern in which bright regions and dark regions alternately repeat, the second light distribution region being further toward an outer side than the first light distribution region in the vehicle width direction, wherein the patterned-light emitter emits light such that intervals between the bright regions that are adjacent are wider at a position further ahead of the vehicle than at a position closer to the vehicle in a traveling direction of the vehicle.

7 Claims, 6 Drawing Sheets

VEHICLE HEADLIGHT DEVICE HAVING A LOW BEAM, A HIGH BEAM AND PATTERN EMITTER THAT EMITS LIGHT INTO A LIGHT DISTRIBUTION REGION HAVING BRIGHT AND DARK REGIONS

This application is based on and claims the benefit of priority from Japanese Patent Application 2023-170517, filed on 29 Sep. 2023, the content of which is incorporated herein by reference.

BACKGROUND OF THE INVENTION

Field of the Invention

The present disclosure relates to a vehicle headlight device.

Related Art

A vehicle headlight device has been proposed that employs a technology in which visibility of a pedestrian can be improved for a driver by emitting light from a light source in an illumination pattern in which bright regions and dark regions alternately repeat (for example, see Japanese Unexamined Patent Application, Publication No. 2022-143872). With the vehicle headlight device of Japanese Unexamined Patent Application, Publication No. 2022-143872, light is emitted simultaneously in a first illumination pattern, in which bright regions and dark regions alternately repeat, and in a second illumination pattern in which all regions are bright regions so that the presence of a pedestrian that is at a position further ahead can be instantaneously recognized by the driver.

Patent Document 1: Japanese Unexamined Patent Application, Publication No. 2022-143872

SUMMARY OF THE INVENTION

However, recent increases in demand for improvement in visibility of an object for a driver have led to a demand for further improvement in technology.

The present disclosure has been made in consideration of the above circumstances, and an object of the present disclosure is to provide a vehicle headlight device capable of reducing the possibility of a driver failing to notice an object.

According to a first aspect of the present disclosure, a vehicle headlight device (for example, a vehicle headlight device 1 that is described later) includes:

a low-beam lamp (for example, a low-beam lamp 5 that is described later) and a high-beam lamp (for example, a high-beam lamp 6 that is described later) that emits light into a first light distribution region (for example, a first light distribution region A1 that is described later) that is in front of a vehicle; and a patterned-light emitter (for example, a patterned-light emitter PP that is described later) that emit light into a second light distribution region (for example, a second light distribution region A2 that is described later) in an illumination pattern in which bright regions (for example, bright regions a1 that are described later) and dark regions (for example, dark regions a2 that are described later) alternately repeat, the second light distribution region being further toward an outer side than the first light distribution region in a vehicle width direction. The patterned-light emitter emits light such that intervals between the bright regions that are adjacent are wider at a position further ahead of the vehicle than at a position closer to the vehicle in a traveling direction of the vehicle.

According to a second aspect of the present disclosure, in the vehicle headlight device of the first aspect, the patterned-light emitter emits light such that the illumination pattern moves along the traveling direction of the vehicle while maintaining a state in which the intervals between the bright regions that are adjacent are wider at a position further ahead of the vehicle than at a position closer to the vehicle in the traveling direction of the vehicle.

According to a third aspect of the present disclosure, in the vehicle headlight device of the first aspect, the patterned-light emitter emits light in an illumination pattern that has the bright regions in a lattice shape including a plurality of first stripes along a first direction and a plurality of second stripes along a second direction intersecting the first direction such that the intervals between the first stripes and the intervals between the second stripes are wider at a position further ahead of the vehicle than at a position closer to the vehicle in the traveling direction of the vehicle.

According to a fourth aspect of the present disclosure, in the vehicle headlight device of the first aspect, the patterned-light emitter emits light such that widths of the bright regions are narrower at a position further ahead of the vehicle than at a position closer to the vehicle in the traveling direction of the vehicle.

According to a fifth aspect of the present disclosure, in the vehicle headlight device of the first aspect, the patterned-light emitter emits light such that the bright regions have a light intensity that is stronger at a position further ahead of the vehicle than at a position closer to the vehicle in the traveling direction of the vehicle.

With the vehicle headlight device of the first aspect, the patterned-light emitter emits light in an illumination pattern, in which bright regions and dark regions alternately repeat, such that intervals between the bright regions that are adjacent are wider at a position further ahead of the vehicle than at a position closer to the vehicle in the traveling direction of the vehicle. With this configuration, it is possible to illuminate further ahead of the vehicle in the traveling direction of the vehicle with light in an illumination pattern in which the intervals between the bright regions do not break up. For this reason, it is possible to clearly recognize an object such as a pedestrian.

With the vehicle headlight device of the second aspect, the patterned-light emitter emits light such that the illumination pattern moves along the traveling direction of the vehicle while maintaining a state in which the intervals between the bright regions that are adjacent are wider at a position further ahead of the vehicle than at a position closer to the vehicle in the traveling direction of the vehicle. With this configuration, it is possible to illuminate further ahead of the vehicle in the traveling direction of the vehicle while moving the illumination pattern in which the intervals between the bright regions do not break up. For this reason, an object such as the pedestrian that is at a position further ahead of the vehicle in the traveling direction of the vehicle can be perceived as flickering and clearly recognized.

With the vehicle headlight device of the third aspect, the patterned-light emitter emits light in an illumination pattern that has the bright regions in a lattice shape including a plurality of first stripes along a first direction and a plurality of second stripes along a second direction intersecting the first direction such that the intervals between the first stripes and the intervals between the second stripes are wider at a position further ahead of the vehicle than at a position closer to the vehicle in the traveling direction of the vehicle. With this configuration, it is possible to illuminate further ahead of the vehicle in the traveling direction of the vehicle while moving the illumination pattern in which the intervals between the bright regions do not break up. For this reason, an object such as the pedestrian that is at a position further ahead of the vehicle in the traveling direction of the vehicle can be perceived as flickering and clearly recognized.

With the vehicle headlight device of the fourth aspect, the patterned-light emitter emits light such that the widths of the bright regions are narrower at a position further ahead of the vehicle than at a position closer to the vehicle in the traveling direction of the vehicle. With this configuration, it is possible to illuminate further ahead of the vehicle in the traveling direction of the vehicle with light in an illumination pattern in which the widths of the bright regions are narrowed to maintain the intervals between the bright regions and in which the outlines do not overlap to break up. For this reason, it is possible to clearly recognize an object such as a pedestrian.

With the vehicle headlight device of the fifth aspect, the light of the bright regions is stronger at a position further ahead of the vehicle than at a position closer to the vehicle in the traveling direction of the vehicle. With this configuration, it is possible to illuminate an object such as the pedestrian that is at a position further ahead of the vehicle in the traveling direction of the vehicle with light in an illumination pattern in which the effect of attenuation of light intensity due to the distance is reduced. For this reason, it is possible to clearly recognize an object such as a pedestrian.

DETAILED DESCRIPTION OF THE INVENTION

The following describes one embodiment of the present disclosure with reference to the drawings. In the following description, "illumination pattern light distribution region" refers to an illumination region of light with specific characteristics, and "illumination pattern" refers to an illumination mode of light on the illumination pattern light distribution region.

Figure 1:
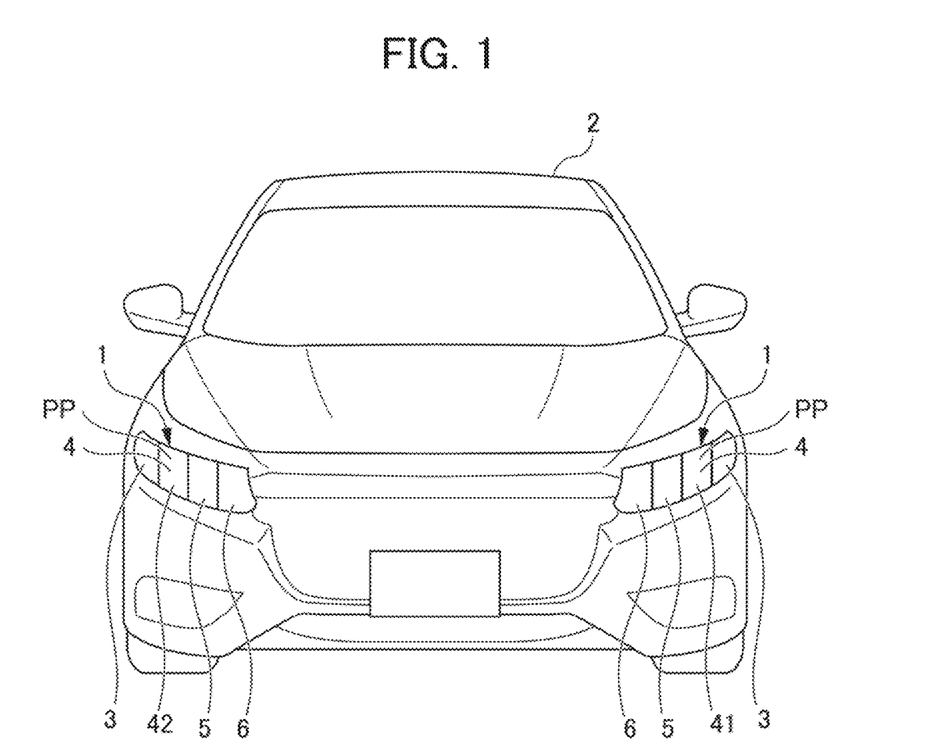
FIG. 1 is a schematic diagram illustrating a vehicle headlight device according to an embodiment of the present disclosure.

FIG. 1 is a schematic diagram illustrating a vehicle headlight device 1 and a detection means according to one embodiment of the present disclosure. The vehicle headlight device 1 is provided on each of a left side and a right side of a vehicle 2 so as to be bilaterally symmetrical when viewed from a center position in a vehicle width direction of the vehicle 2. In the vehicle headlight device 1, a turn signal lamp 3, a pattern illumination lamp 4, a low-beam lamp 5, and a high-beam lamp 6 are arranged in this order from an outer side of the vehicle 2 toward an inner side of the vehicle 2 in the vehicle width direction. The pattern illumination lamp 4 is a collective term for a left pattern illumination lamp 41 and a right pattern illumination lamp 42.

The turn signal lamp 3 is a conventional lamp of this type. The pattern illumination lamp 4, which is a constituent element of a patterned-light emitter PP, illuminates a second light distribution region A2 that is described later of the vehicle 2 with light in an illumination pattern (see FIG. 5) in which bright regions a1 and dark regions a2 alternately repeat. The low-beam lamp 5 illuminates a low-beam light distribution region AL with light. The high-beam lamp 6 illuminates a high-beam light distribution region AH with light. Hereinafter, the vehicle 2, which is equipped with the vehicle headlight device 1, may be referred to as a host vehicle 2 as appropriate. In the above description, the second light distribution region A2 that is in front to the right of a travel lane of the host vehicle 2 is referred to as a right second light distribution region A22. Further, the second light distribution region A2 that is in front to the left of the travel lane of the host vehicle 2 is referred to as a left second light distribution region.

Figure 2:
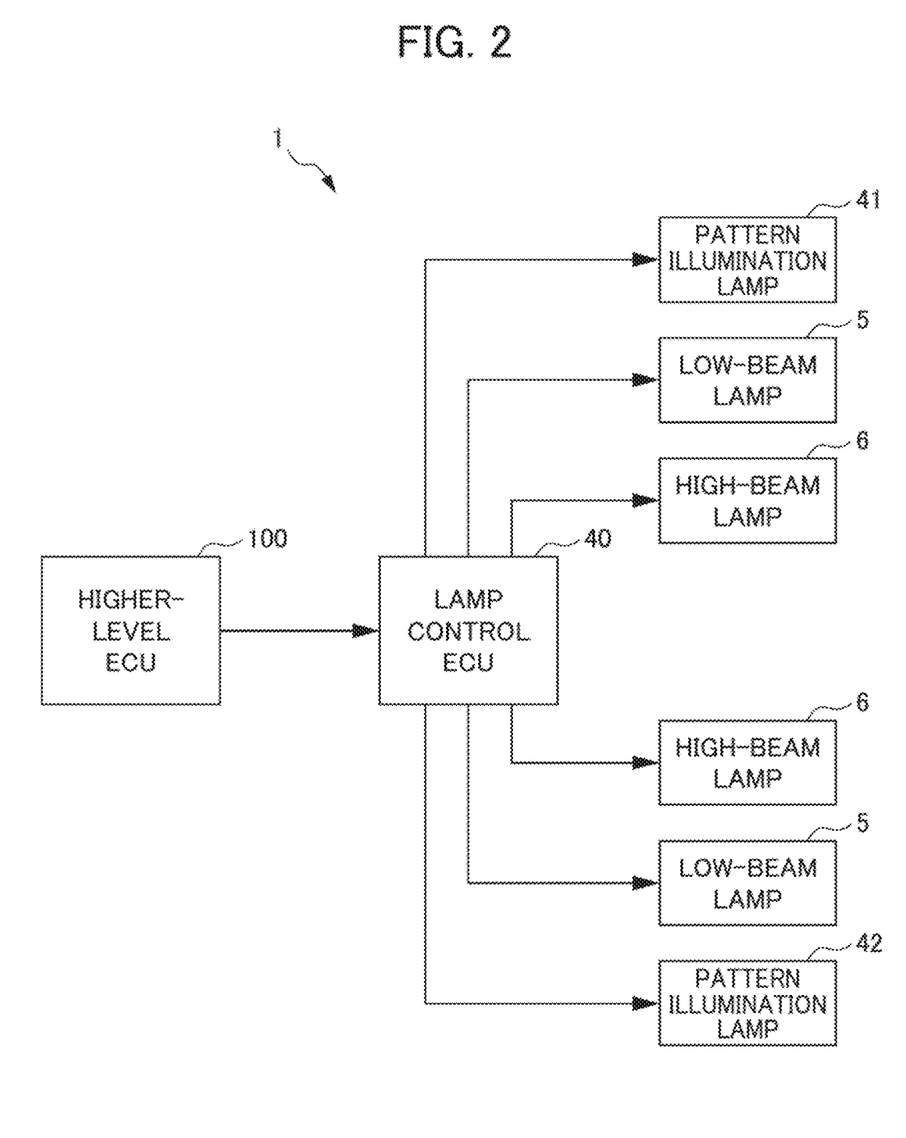
FIG. 2 is a conceptual configuration diagram illustrating a control system for each lamp in the vehicle headlight device in FIG. 1.
Figure 3:
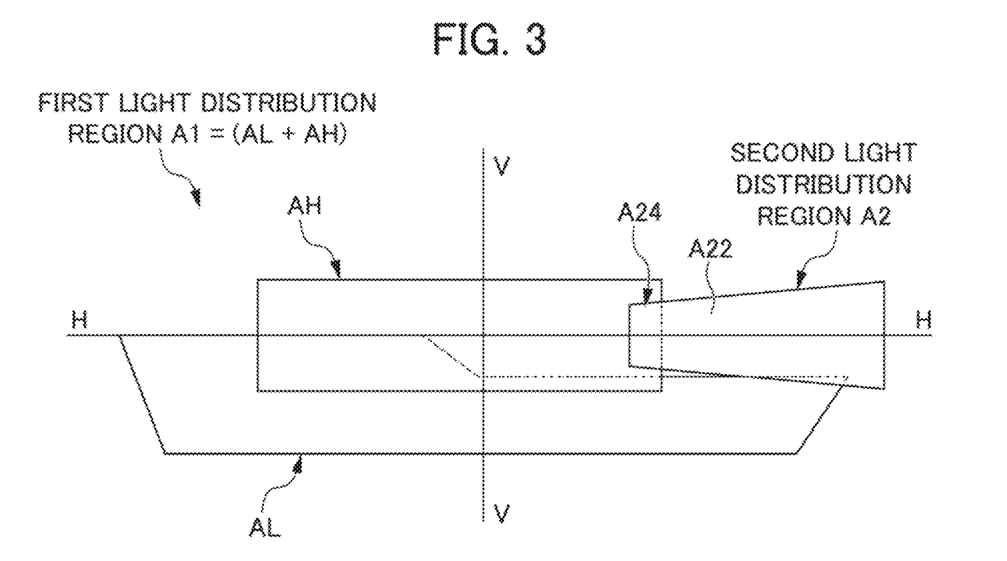
FIG. 3 is a view illustrating an illumination region of each lamp in the vehicle headlight device in FIG. 1.

FIG. 2 is a conceptual configuration diagram illustrating a control system for each lamp in the vehicle headlight device 1 in FIG. 1. FIG. 3 is a view illustrating an illumination region of each lamp in the vehicle headlight device 1. The high-beam lamp 6, the low-beam lamp 5, the left pattern illumination lamp 41, and the right pattern illumination lamp 42 operate under control of a lamp control electronic control unit (ECU) 40. The lamp control ECU 40 switches operation modes of the high-beam lamp 6, the low-beam lamp 5, the left pattern illumination lamp 41, and the right pattern illumination lamp 42 based on an output from a higher-level ECU 100 or the like equipped in the vehicle 2.

The high-beam lamp 6 includes a light-emitting element that is a light source, a reflector, a light shielding plate which defines an illumination region, and a lens. Power is supplied by a power source, not shown, in accordance with a control signal from the lamp control ECU 40, causing the light-emitting element to emit light. The light emitted from the light emitting element is reflected by the reflector. The reflected light from the reflector radiates from the lens toward the high-beam light distribution region AH defined by the light shielding plate.

The low-beam lamp 5 includes a light-emitting element that is a light source, a reflector, a light shielding plate which defines an illumination region, and a lens. Power is supplied by a power source, not shown, in accordance with a control signal from the lamp control ECU 40, causing the light-emitting element to emit light. The light from the light-emitting element is reflected by the reflector. The reflected light from the reflector radiates from the lens toward the low-beam light distribution region AL defined by the light shielding plate.

with reference to FIG. 3, the illumination regions of the high-beam lamp 6, the low-beam lamp 5, and the pattern illumination lamp 4 in a case in which the vehicle headlight device 1 in FIG. 1 illuminates a test screen with light are described. Here, the illumination region due to the pattern illumination lamp 4 indicates the illumination region by the right pattern illumination lamp 42.

The illumination region of the left pattern illumination lamp 41 is symmetrical to the illumination region of the right pattern illumination lamp 42 about a line V-V but is not shown.

The configuration and operation of the left pattern illumination lamp 41 are similar to the configuration and operation of the right pattern illumination lamp 42. For this reason, in the following, the description of the right pattern illumination lamp 42 will be referred to for the configuration and operation of the left pattern illumination lamp 41.

The low-beam light distribution region AL of the low-beam lamp 5 has an oncoming-lane-side cutoff line extending in parallel with a line H-H (horizontal line) on the right of the line V-V (vertical line) that is central in a left-right direction on the test screen. On the left side of the line V-V, the low-beam light distribution region AL of the low-beam lamp 5 has an own-lane-side cutoff line extending along the line H-H at a position higher than the oncoming-lane-side cutoff line. Both the oncoming-lane-side cutoff line and the own-lane-side cutoff line are connected by an oblique cutoff line inclined with respect to the line H-H. The low-beam light distribution region AL is a lower portion illumination region that is in front and downward of the vehicle 2.

The high-beam light distribution region AH of the high-beam lamp 6 has a rectangular shape with a long side parallel to the line H-H and a short side parallel to the line V-V and has diagonals that intersect at roughly the same position as the intersection of the line H-H and the line V-V. The high-beam light distribution region AH overlaps the low-beam light distribution region AL in a lower partial region including a portion of the oncoming-lane-side cutoff line and a portion of the low-beam light distribution region AL, that are both close to the line V-V. The high-beam light distribution region AH is an upper illumination region that is more upward and is more central in the vehicle width direction of the vehicle 2 than the low-beam light distribution region AL, which is a lower portion illumination region. The low-beam light distribution region AL and the high-beam light distribution region AH are collectively referred to as a first light distribution region A1.

The right second light distribution region A22, which is an illumination region of the right pattern illumination lamp 42, has an illumination pattern that can change in various ways, such as the shape of the outline of the region and a scheme of the illumination pattern in the region, due to a mode switching signal from the lamp control ECU 40. The left second light distribution region, which is symmetrical to the right second light distribution region A22 about the line V-V, is not illustrated. The left second light distribution region and the right second light distribution region A22 are collectively referred to as the second light distribution region A2.

Due to capabilities of the right pattern illumination lamp 42, the right second light distribution region A22 may have a wide form that includes an overlapping region A24 that overlaps the high-beam light distribution region AH. When adopting this shape, the right second light distribution region A22 has a trapezoidal shape that in a landscape orientation in which the height direction is parallel to the line H-H and the upper base and the lower base are parallel to the line V-V. This trapezoid shape has a lower base that is relatively further from the line V-V than an upper base and is longer than the upper base. That is, the right second light distribution region A22 has a shape in which the dimension along the line V-V increases toward the outer side in the vehicle width direction of the vehicle 2.

Figure 4:
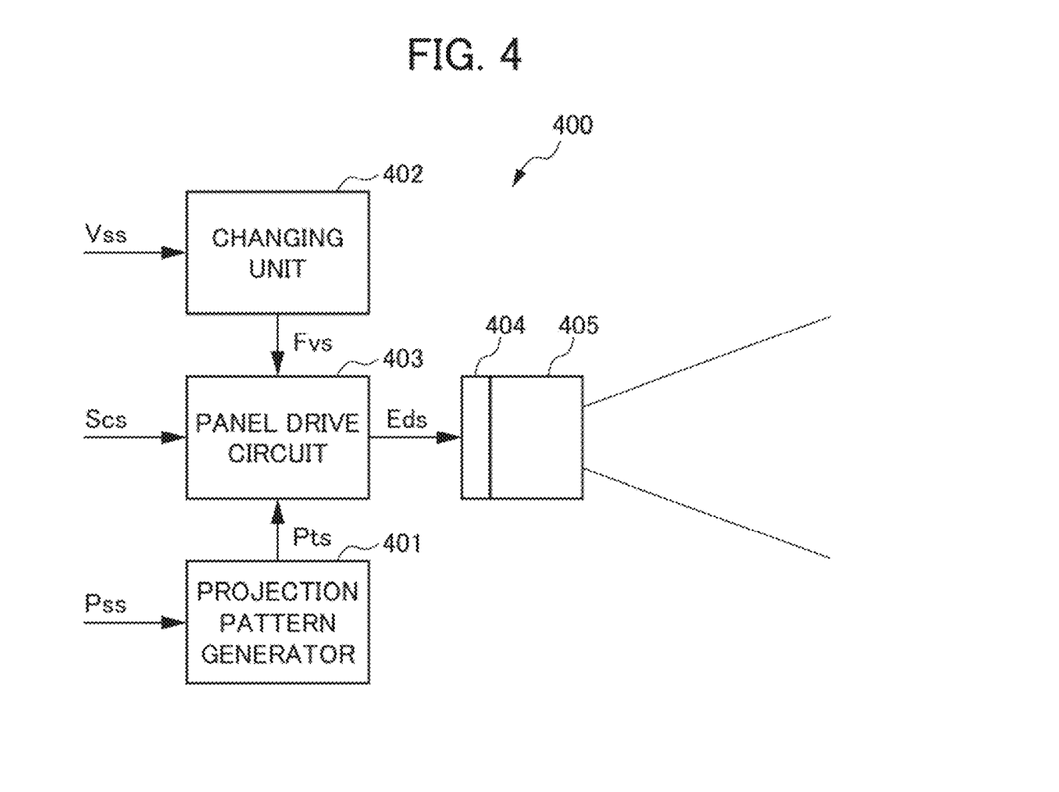
FIG. 4 is a conceptual configuration diagram illustrating a system related to a pattern illumination lamp in FIG. 2.

Next, with reference to FIG. 4, the pattern illumination lamp 4 (the left pattern illumination lamp 41 and the right pattern illumination lamp 42) is further described. FIG. 4 is a conceptual configuration diagram illustrating a system related to the pattern illumination lamp 4 in FIG. 2. This system has a configuration that is common to the left pattern illumination lamp 41 and the right pattern illumination lamp 42, and is referred to herein as a pattern illumination lamp system 400. The pattern illumination lamp system 400 that is applied to each of the left pattern illumination lamp 41 and the right pattern illumination lamp 42 is the patterned-light emitter PP in the vehicle headlight device 1 according to the present disclosure. The pattern illumination lamp system 400 includes a projection pattern generator 401, a changing unit 402, a panel drive circuit 403, a light modulation unit 404, and a projection optical system 405. In practice, the panel drive circuit 403 and the light modulation unit 404 are disposed apart from each other for thermal insulation, and both are connected by a harness. The projection pattern generator 401 generates an illumination pattern signal Pts representing an illumination pattern in which the bright regions a1 and the dark regions a2 alternately repeat in a form defined by a pattern selection signal Pss supplied by the lamp control ECU 40 of FIG. 2. Based on a vehicle speed signal Vss supplied by the lamp control ECU 40, the changing unit 402 generates a flow speed signal Fvs that defines a flow speed at which the illumination pattern flows from a position further ahead in front of the vehicle 2 to a position closer to the vehicle 2 in the traveling direction of the vehicle 2.

The panel drive circuit 403 is activated by an activation command signal Scs that is supplied by the lamp control ECU and generates an element drive signal Eds to drive the light modulation unit 404. The element drive signal Eds is a signal for causing the illumination pattern, in which the bright regions a1 and the dark regions a2 that are defined by the illumination pattern signal Pts generated by the projection pattern generator 401 alternately repeat, to flow at a speed defined by the flow speed signal Fvs. With this configuration, the light modulation unit 404, through the projection optical system 405, illuminates the second light distribution region A2 with the illumination pattern so that the illumination pattern flows along the traveling direction of the vehicle 2. The changing unit 402 supplies the flow speed signal Fvs to the panel drive circuit 403 in accordance with the vehicle speed signal Vss that represents the vehicle speed of the vehicle 2, and causes the speed at which the illumination pattern Pf flows to match the speed at which scenery is perceived to flow past the vehicle as viewed from the vehicle 2.

Figure 5:
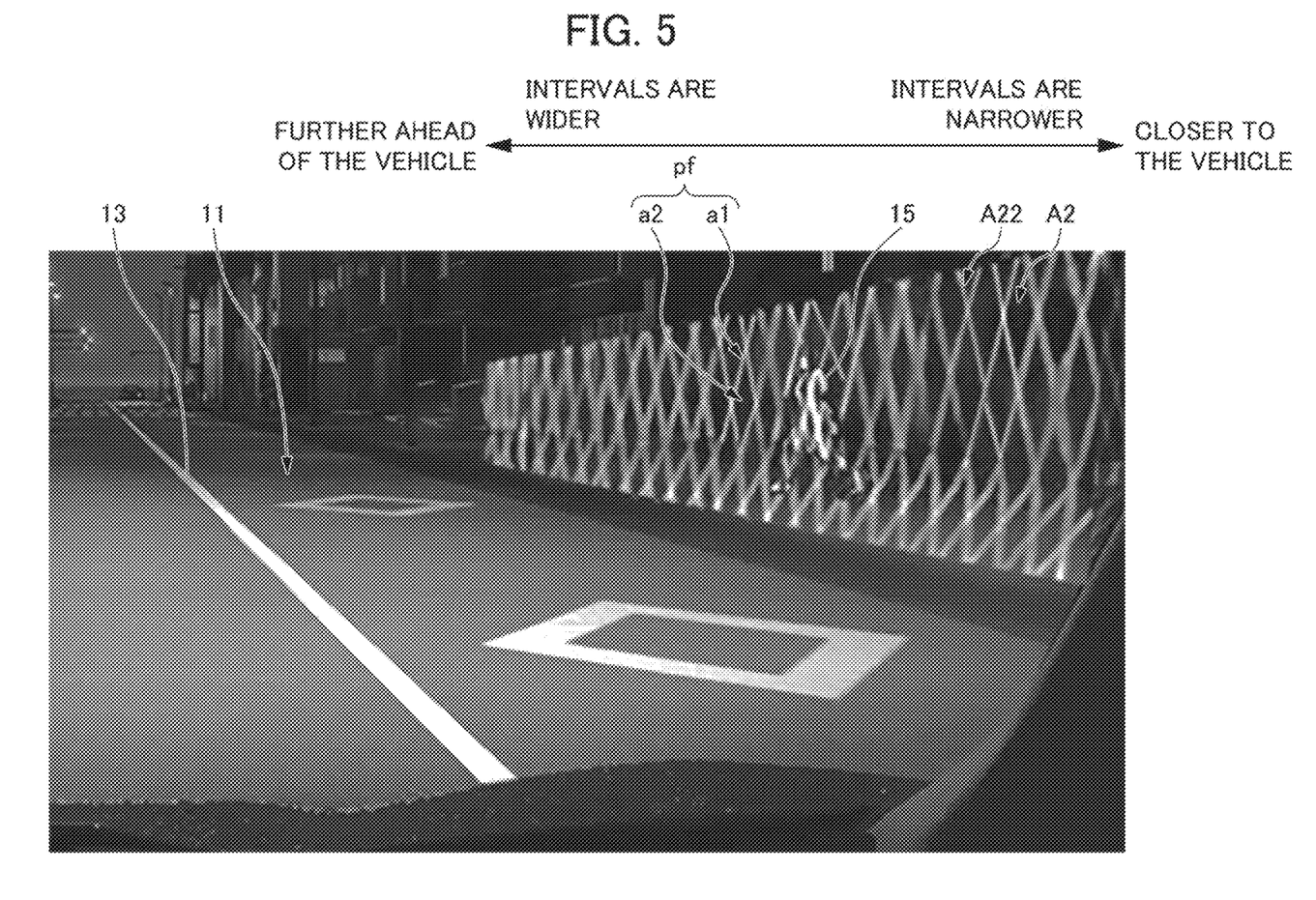
FIG. 5 is a view illustrating a driver's field of view illuminated with illuminating light according to one embodiment of the present disclosure from the pattern illumination lamp in FIG. 2.

FIG. 5 is a view illustrating a driver's field of view illuminated with illuminating light according to one embodiment of the present disclosure from the pattern illumination lamp in FIG. 2. A lane marking 13 is drawn on the road 11, and at a side of the road 11 is a sidewalk. It is assumed that a pedestrian 15 is present on the sidewalk. A region that includes the sidewalk on the right side as viewed from the driver is the right second light distribution region A22 illuminated by the right pattern illumination lamp 42. In FIG. 5, the right second light distribution region A22 is indicated by the reference sign of the second light distribution region A2 which is a collective term that also refers to the left second light distribution region. The right pattern illumination lamp 42 illuminates the right second light distribution region A22 with right illuminating light PLR with the illumination pattern in which the bright regions a1 and the dark regions a2 alternately repeat.

As already described, the right illuminating light PLR is emitted upon the lamp control ECU 40 determining, based on information input from the higher-level ECU 100, that no adverse conditions will result from the right illuminating light PLR being emitted. Upon determining that the left illuminating light PLL should be emitted, the lamp control ECU 40 generates the activation command signal Scs, causing the left illuminating light PLL to be emitted from the left pattern illumination lamp 41 and illuminating the left second light distribution region that includes another sidewalk and which is not shown in FIG. 5.

Figure 6:
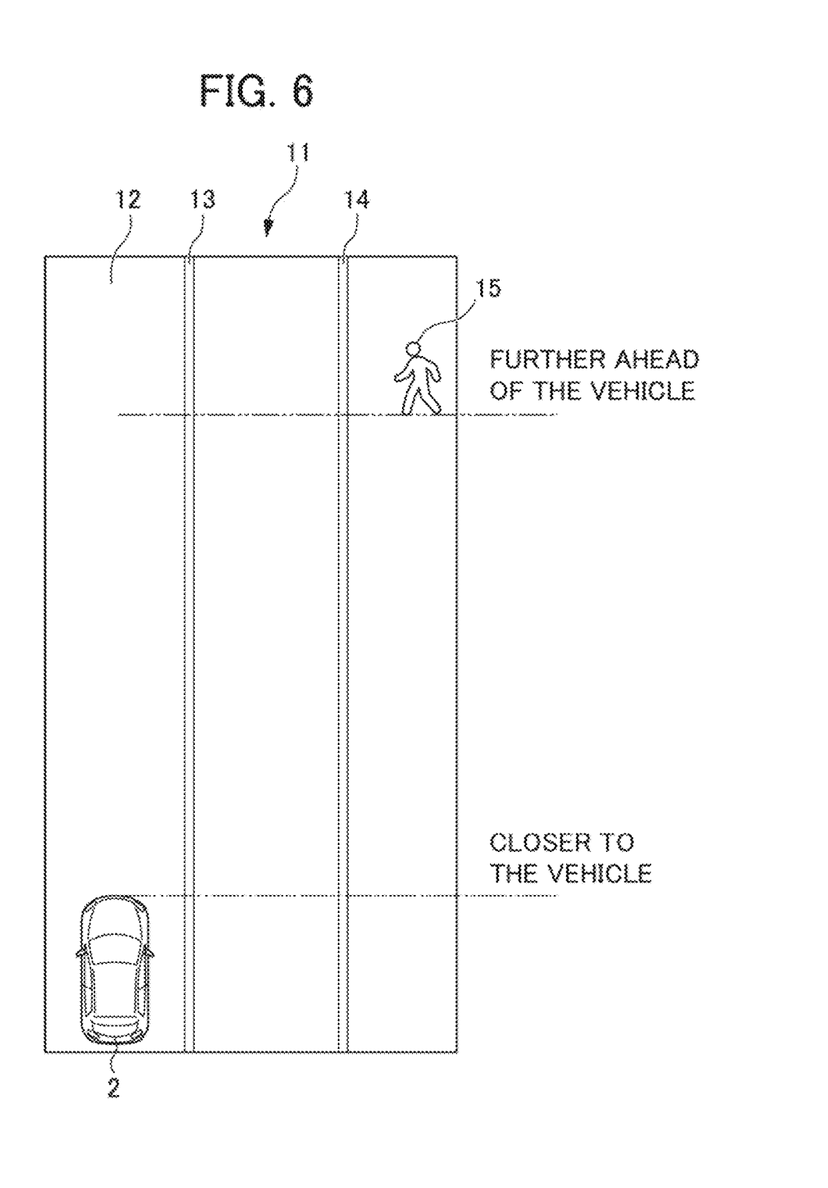
FIG. 6 is a diagram illustrating definitions of concepts of "closer to the vehicle" and "further ahead of the vehicle" in the present disclosure.

FIG. 6 is a diagram illustrating definitions of concepts of "closer to the vehicle 2" and "further ahead of the vehicle 2" in the present disclosure. A lane marking 13 and a lane marking 14 are drawn on the travel lane of the host vehicle 2 on the road 11. In FIG. 6, a broken line is drawn across the road 11 at a position closer to the host vehicle 2, and as represented by "closer to the vehicle 2", the position of the broken line indicates a position that is relatively "closer to the host vehicle 2". A broken line is drawn across the road 11 in front of the host vehicle 2, and as represented by "further ahead of the vehicle", the position of the broken line indicates a position that is relatively "further ahead of the host vehicle 2".

In FIG. 5, the patterned-light emitter PP emits light in an illumination pattern Pf such that intervals between the bright regions a1 that are adjacent and parallel are wider at a position further ahead of the vehicle 2 than at a position closer to the vehicle 2 in the traveling direction of the vehicle 2. Hereinafter, this embodiment of patterned-light illumination by the patterned-light emitter PP may be referred to as a first mode of patterned-light illumination as appropriate. To the driver, distant views are perceived as being relatively compressed. For this reason, in a case in which the intervals between the bright regions a1 that are adjacent and parallel are uniform regardless of the distance from the vehicle, the intervals between the bright regions a1 that are adjacent and parallel would appear narrower. However, with the first mode of patterned-light illumination, the intervals between the bright regions a1 that are adjacent and parallel in the illumination pattern Pf are wider at a position further ahead of the vehicle 2 than at a position closer to the vehicle 2 in the traveling direction of the vehicle 2. With this configuration, the degree of narrowing of the intervals between the bright regions a1 due to the distance from the vehicle 2 appears smaller to the driver. Accordingly, even at a position further ahead of the vehicle 2 in the traveling direction of the vehicle 2, the outlines of the bright regions a1 that are adjacent and parallel in the illumination pattern Pf do not overlap and break up, and can be recognized. For this reason, it is possible to clearly recognize an object such as the pedestrian 15.

In other embodiments of the patterned-light illumination emitted by the patterned-light emitter PP, the light is emitted such that the illumination pattern Pf moves along the traveling direction of the vehicle 2 while maintaining a state in which the intervals between the bright regions a1 that are adjacent are wider at a position further ahead of the vehicle 2 than at a position closer to the vehicle 2 in the traveling direction of the vehicle 2. Hereinafter, this embodiment of patterned-light illumination by the patterned-light emitter PP may be referred to as a second mode of patterned-light illumination as appropriate. Also, in the case of the second mode of patterned-light illumination, even at a position further ahead of the vehicle 2 in the traveling direction of the vehicle 2, the outlines of the bright regions a1 that are adjacent and parallel in the illumination pattern Pf can be recognized without overlapping and breaking up. For this reason, it is possible to clearly recognize an object such as the pedestrian 15. With the second mode of patterned-light illumination, it is possible to illuminate further ahead of the vehicle 2 in the traveling direction of the vehicle 2 while moving the illumination pattern in which the intervals between the bright regions a1 do not break up. For this reason, an object such as the pedestrian 15 that is at a position further ahead of the vehicle 2 in the traveling direction of the vehicle 2 can be perceived as flickering and clearly recognized.

In other embodiments of the patterned-light illumination emitted by the patterned-light emitter PP, the light is emitted in an illumination pattern that has the bright regions a1 in a lattice shape including a plurality of first stripes along a first direction and a plurality of second stripes along a second direction intersecting the first direction such that the intervals between the first stripes and the intervals between the second stripes are wider at a position further ahead of the vehicle 2 than at a position closer to the vehicle 2 in the traveling direction of the vehicle 2. Hereinafter, this embodiment of patterned-light illumination by the patterned-light emitter PP may be referred to as a third mode of patterned-light illumination as appropriate. In the case of the third mode of patterned-light illumination and in the case of the second mode of patterned-light illumination, even at a position further ahead of the vehicle 2 in the traveling direction of the vehicle 2, the outlines of the bright regions a1 that are adjacent and parallel in the illumination pattern Pf can be recognized without overlapping and breaking up. For this reason, it is possible to clearly recognize an object such as the pedestrian 15. With the second mode of patterned-light illumination, it is possible to illuminate further ahead of the vehicle 2 in the traveling direction of the vehicle 2 while moving the illumination pattern in which the intervals between the bright regions a1 do not break up. For this reason, an object such as the pedestrian 15 that is at a position further ahead of the vehicle 2 in the traveling direction of the vehicle 2 can be perceived as flickering and clearly recognized.

In other embodiments of the patterned-light illumination emitted by the patterned-light emitter PP the light is emitted such that the widths of the stripes of the bright region a1 are narrower at a position further ahead of the vehicle 2 than at a position closer to the vehicle 2 in the traveling direction of the vehicle 2. Hereinafter, this embodiment of patterned-light illumination by the patterned-light emitter PP may be referred to as a fourth mode of patterned-light illumination as appropriate. In the case of the fourth mode of patterned-light illumination, the patterned-light emitter PP emits light further ahead of the vehicle 2 in the traveling direction of the vehicle 2 to form an illumination pattern in which the width of the stripes of the bright regions a1 are narrowed to maintain the interval between the bright regions a1 and the outlines do not overlap and break up. For this reason, it is possible to clearly recognize an object such as the pedestrian 15.

In other embodiments of the patterned-light illumination emitted by the patterned-light emitter PP, the bright regions a1 have a light intensity that is stronger at a position further ahead of the vehicle 2 than at a position closer to the vehicle 2 in the traveling direction of the vehicle 2. Hereinafter, this embodiment of patterned-light illumination by the patterned-light emitter PP may be referred to as a fifth mode of patterned-light illumination as appropriate. In the case of the fifth mode of patterned-light illumination, it is possible to illuminate an object such as the pedestrian 15 that is at a position further ahead of the vehicle 2 in the traveling direction of the vehicle 2 with light in an illumination pattern in which the effect of attenuation of light intensity due to the distance is reduced. For this reason, it is possible to clearly recognize an object such as the pedestrian 15.

The above first mode of patterned-light illumination is a broader concept that includes any mode of patterned-light illumination from the second mode of patterned-light illumination to the fifth mode of patterned-light illumination. Further, the fourth mode of patterned-light illumination and the fifth mode of patterned-light illumination may be performed together with any other mode of patterned-light illumination.

Figure 7:
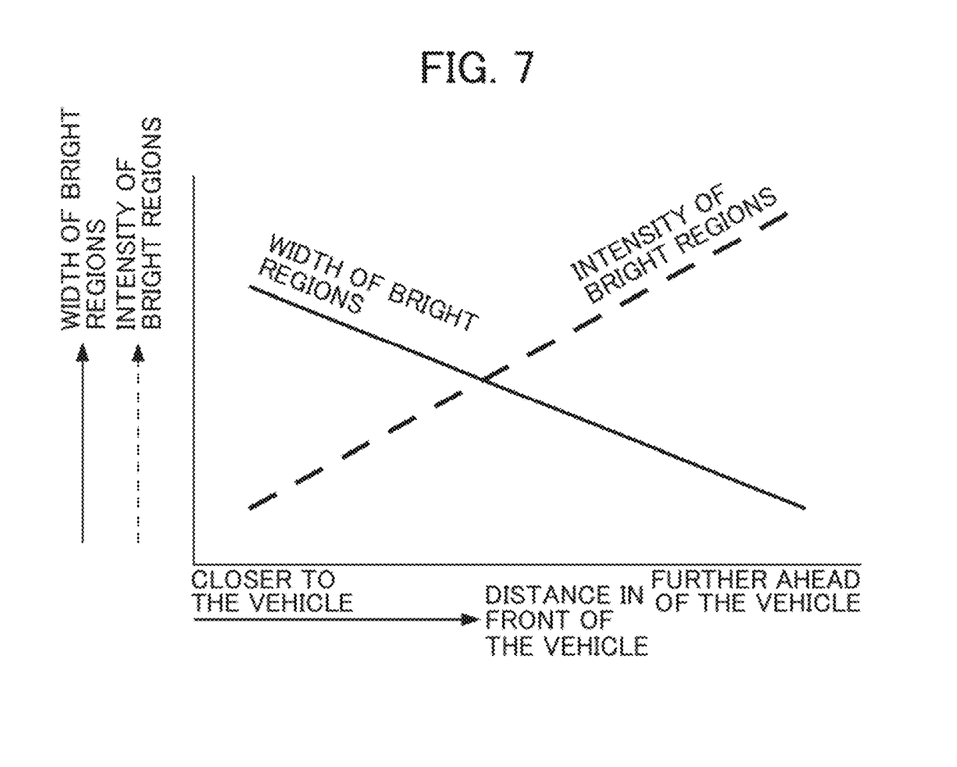
FIG. 7 is a characteristic diagram illustrating a control scheme of a control system relating to the pattern illumination lamp in FIG. 2.

FIG. 7 is a characteristic diagram illustrating the fourth mode of patterned-light illumination and the fifth mode of patterned-light illumination. In FIG. 7, the solid line represents the characteristic of the fourth mode of patterned-light illumination, and the broken line represents the characteristic of the fifth mode of patterned-light illumination.

The first mode of patterned-light illumination to the fifth mode of patterned-light illumination described above by the patterned-light emitter PP are realized by selecting the operation mode of the pattern illumination lamp system 400 in FIG. 4. As described above, the first mode of patterned-light illumination is a broader concept that includes any mode of patterned-light illumination from the second mode to the fifth mode. Therefore, specifically, the pattern illumination lamp system 400 operates in an operation mode corresponding to at least one mode from the second mode of patterned-light illumination to the fifth mode of patterned-light illumination. Next, the following describes the operation of the pattern illumination lamp system 400 when illuminating with each mode from the second mode to the fifth mode of patterned-light illumination.

When illuminating with the second mode of patterned-light illumination, the projection pattern generator 401 creates, in accordance with the pattern selection signal Pss from the lamp control ECU 40, an illumination pattern signal Pts for generating an illumination pattern, in which the bright regions a1 and the dark regions a2 alternately repeat and the intervals between the bright regions a1 that are adjacent are wider at a position further ahead of the vehicle 2 than at a position closer to the vehicle 2 in the traveling direction of the vehicle 2, and supplies the illumination pattern signal Pts to the panel drive circuit 403. On the other hand, in accordance with the vehicle speed signal Vss from the lamp control ECU 40, the changing unit 402 creates the flow speed signal Fvs for obtaining an appropriate movement speed of the illumination pattern in accordance with the vehicle speed, and supplies the flow speed signal Fvs to the panel drive circuit 403. The panel drive circuit 403 creates an element drive signal Eds for obtaining an illumination pattern and the movement speed defined by the illumination pattern signal Pts and the flow speed signal Fvs, and supplies the element drive signal Eds to the light modulation unit 404. With this configuration, illuminating light, with an illumination pattern and a movement mode corresponding to the second mode of pattern illumination created through the light modulation unit 404, is emitted from the projection optical system 405.

The operation of the pattern illumination lamp system 400 when illuminating with the third mode of patterned-light illumination is substantially the same as the operation of the pattern illumination lamp system 400 when illuminating with the second mode of patterned-light illumination described above. However, when illuminating with the third mode of patterned-light illumination, the projection pattern generator 401 creates an illumination pattern signal Pts and supplies the illumination pattern signal Pts to the panel drive circuit 403. The illumination pattern signal Pts generates an illumination pattern that has the bright regions a1 in the lattice shape including the plurality of first stripes along the first direction and the plurality of second stripes along the second direction intersecting the first direction such that the intervals between the first stripes and the intervals between the second stripes are wider at a position further ahead of the vehicle 2 than at a position closer to the vehicle 2 in the traveling direction of the vehicle 2.

The operation of the pattern illumination lamp system 400 in the fourth mode of patterned-light illumination is substantially the same as the operation of the pattern illumination lamp system 400 in the second mode of patterned-light illumination described above. However, when illuminating with the fourth mode of patterned-light illumination, the projection pattern generator 401 creates an illumination pattern signal Pts for generating an illumination pattern such that the widths of the bright regions a1 are narrower at a position further ahead of the vehicle 2 than at a position closer to the vehicle 2 in the traveling direction of the vehicle 2, and supplies the illumination pattern signal Pts to the panel drive circuit 403.

The operation of the pattern illumination lamp system 400 in the fifth mode of patterned-light illumination is substantially the same as the operation of the pattern illumination lamp system 400 in the second mode of patterned-light illumination described above. However, when illuminating with the fifth mode of patterned-light illumination, illuminating light which is narrowed down and focused toward the distance to increase the intensity per unit illumination area is emitted by the projection pattern generator 401, the panel drive circuit 403, the light modulation unit 404, and the projection optical system 405.

Figure 8:
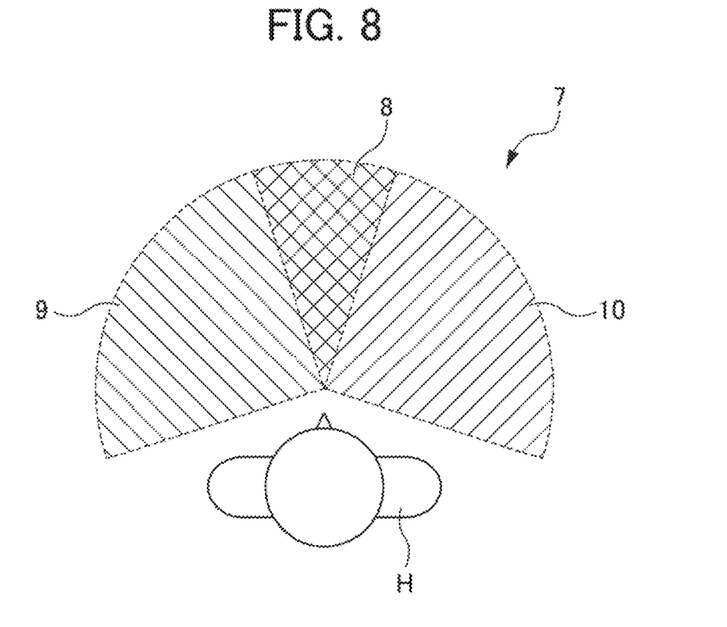
FIG. 8 is a diagram schematically illustrating human visual characteristics according to the technical idea of the present disclosure.

Here, FIG. 8 is a diagram schematically illustrating human visual characteristics that form the basis for the technical idea of the vehicle headlight device 1 according to the present disclosure. FIG. 8 illustrates a front field of view 7 of a human H divided, based on human visual characteristics, into a central field of view 8 that extends at a constant acute angle from the front to the left and right as well as a left peripheral field of view 9 and a right peripheral field of view 10 that are adjacent to the central field of view 8 on the left and right sides, respectively.

Regarding visual characteristics of an average human, shapes are clearly visible in the central field of view 8, but responses to movement tend to be slow. Whereas, in the left peripheral field of view 9 and the right peripheral field of view 10, shapes tend to be blurred, but responses to movement are fast, that is, the sensitivity to movement is higher. The vehicle headlight device 1 according to the present disclosure is based on the idea of actively utilizing the human visual characteristics described above. In the vehicle headlight device 1 according to the present disclosure, the illumination pattern, in which the bright regions a1 and the dark regions a2 alternately repeat, is projected into the left peripheral field of view 9 and the right peripheral field of view 10. Thus the driver can clearly recognize a moving object such as the pedestrian 15 on the road side, and the possibility of the driver failing to notice the pedestrian 15 can be further effectively reduced.

According to the vehicle headlight device 1 of the present embodiment, the following effects can be achieved.

With the vehicle headlight device 1 of the first aspect, the vehicle headlight device 1 includes a low-beam lamp 5 and a high-beam lamp 6 that emit light into the first light distribution region A1 that is in front of the vehicle, and the patterned-light emitter PP that emits light into the second light distribution region A2 in an illumination pattern in which bright regions a1 and dark regions a2 alternately repeat. The second light distribution region A2 is further toward the outer side than the first light distribution region A1 in the vehicle width direction. The patterned-light emitter PP emits light such that intervals between the bright regions a1 that are adjacent are wider at a position further ahead of the vehicle 2 than at a position closer to the vehicle 2 in the traveling direction of the vehicle 2. With this configuration, it is possible to illuminate further ahead of the vehicle 2 in the traveling direction of the vehicle 2 in an illumination pattern in which the intervals between the bright regions a1 do not break up. For this reason, it is possible to clearly recognize an object such as the pedestrian 15.

With the vehicle headlight device 1 of the second aspect, the patterned-light emitter PP emits light such that the illumination pattern moves along the traveling direction of the vehicle 2 while maintaining a state in which the intervals between the bright regions a1 that are adjacent are wider at a position further ahead of the vehicle 2 than at a position closer to the vehicle 2 in the traveling direction of the vehicle 2. With this configuration, it is possible to illuminate further ahead of the vehicle 2 in the traveling direction of the vehicle 2 while moving the illumination pattern in which the intervals between the bright regions a1 do not break up. For this reason, an object such as the pedestrian 15 that is at a position further ahead of the vehicle 2 in the traveling direction of the vehicle 2 can be perceived as flickering and clearly recognized.

With the vehicle headlight device 1 of the third aspect, the changing unit 402, in accordance with the speed of the vehicle 2, causes the speed at which the illumination pattern Pf flows to match the speed at which scenery is perceived to flow past the vehicle as viewed from the vehicle 2. With this configuration, the speed at which scenery is perceived to flow past the vehicle as viewed from the vehicle 2 and the speed at which the illumination pattern Pf flows match. Thus the flow of scenery as viewed from the vehicle 2 and the flow of the illumination pattern Pf are synchronized, and the presence of the pedestrian 15 can be easily recognized by the driver of the vehicle 2.

With the vehicle headlight device 1 of the fourth aspect, the patterned-light emitter PP emits light such that the widths of the bright regions a1 are narrower at a position further ahead of the vehicle 2 than at a position closer to the vehicle 2 in the traveling direction of the vehicle 2. With this configuration, it is possible to illuminate further ahead of the vehicle 2 in the traveling direction of the vehicle 2 with light in an illumination pattern in which the widths of the bright regions a1 are narrowed to maintain the intervals between the bright regions and in which the outlines do not overlap and break up. For this reason, it is possible to clearly recognize an object such as the pedestrian 15.

With the vehicle headlight device 1 of the fifth aspect, the patterned-light emitter PP emits light such that the bright regions a1 have a light intensity that is stronger at a position further ahead of the vehicle 2 than at a position closer to the vehicle 2 in the traveling direction of the vehicle 2. With this configuration, it is possible to illuminate an object such as the pedestrian 15 that is at a position further ahead of the vehicle 2 in the traveling direction of the vehicle 2 with an illumination pattern in which the effect of attenuation of light intensity due to the distance is reduced. For this reason, it is possible to clearly recognize an object such as the pedestrian 15.

The above describes one embodiment of the vehicle headlight device of the present disclosure, but the configuration of the details may be changed within the scope of the gist of the present disclosure as appropriate. For example, in the example of FIG. 4, the light modulation unit 404 is driven by the illumination pattern signal Pts from the projection pattern generator 401 of the pattern illumination lamp system 400 and the element drive signal Eds from the panel drive circuit 403 to obtain a predetermined illumination pattern, but this configuration may take other forms. In other words, the pattern illumination lamp system 400 may be configured as a projector in which a digital micromirror device (DMD) that includes a micromirror group is driven by the illumination pattern signal Pts and the element drive signal Eds to obtain a predetermined illumination pattern and a predetermined illuminating light intensity.

EXPLANATION OF REFERENCE NUMERALS

A1 first light distribution region
A2 second light distribution region
A22 right second light distribution region
A24 overlapping region
AL low-beam light distribution region
AH high-beam light distribution region
a1 bright region
A2 dark region
H human
PP patterned-light emitter
Pf illumination pattern
Pss pattern selection signal
Pts illumination pattern signal
Vss vehicle speed signal
Scs activation command signal
Fvs flow speed signal
Eds element drive signal
1 vehicle headlight device
2 vehicle
3 turn signal lamp
4 pattern illumination lamp
5 low-beam lamp
6 high-beam lamp
7 front field of view
8 central field of view
9 left peripheral field of view
10 right peripheral field of view
11 road
12 travel lane of host vehicle
13 lane marking
14 lane marking
15 pedestrian
40 lamp control ECU 40
41 left pattern illumination lamp
42 right pattern illumination lamp
400 pattern illumination lamp system
401 projection pattern generator
402 changing unit
403 panel drive circuit
404 light modulation unit
405 projection optical system

What is claimed is:

1. A vehicle headlight device comprising:
    a low-beam lamp and a high-beam lamp that emit light into a first light distribution region that is in front of a vehicle; and
    a patterned-light emitter that emits light into a second light distribution region in an illumination pattern in which bright regions and dark regions alternately repeat, the second light distribution region being further toward an outer side than the first light distribution region in a vehicle width direction, wherein
    the patterned-light emitter emits light such that intervals between the bright regions are formed along an entire length of the illumination pattern in a traveling direction of the vehicle, and the intervals between the bright regions that are adjacent are wider at a position further ahead of the vehicle than at a position closer to the vehicle in the traveling direction of the vehicle.

2. The vehicle headlight device according to claim 1, wherein the patterned-light emitter emits light such that the illumination pattern moves along the traveling direction of the vehicle while maintaining a state in which the intervals between the bright regions that are adjacent are wider at a position further ahead of the vehicle than at a position closer to the vehicle in the traveling direction of the vehicle.

3. The vehicle headlight device according to claim 1, wherein the patterned-light emitter emits light in an illumination pattern that has the bright regions in a lattice shape including a plurality of first stripes along a first direction and a plurality of second stripes along a second direction intersecting the first direction such that the intervals between the first stripes and the intervals between the second stripes are wider at a position further ahead of the vehicle than at a position closer to the vehicle in the traveling direction of the vehicle.

4. The vehicle headlight device according to claim 1, wherein the patterned-light emitter emits light such that widths of the bright regions are narrower at a position further ahead of the vehicle than at a position closer to the vehicle in the traveling direction of the vehicle.

5. The vehicle headlight device according to claim 1, wherein the patterned-light emitter emits light such that the bright regions have a light intensity that is stronger at a position further ahead of the vehicle than at a position closer to the vehicle in the traveling direction of the vehicle.

6. A vehicle headlight device comprising:
    a low-beam lamp and a high-beam lamp that emit light into a first light distribution region that is in front of a vehicle; and
    a patterned-light emitter that emits light into a second light distribution region in an illumination pattern in which bright regions and dark regions alternately repeat, the second light distribution region being further toward an outer side than the first light distribution region in a vehicle width direction, wherein
    the patterned-light emitter emits light such that intervals between the bright regions that are adjacent are wider at a position further ahead of the vehicle than at a position closer to the vehicle in a traveling direction of the vehicle,
    wherein the patterned-light emitter emits light in an illumination pattern that has the bright regions in a lattice shape including a plurality of first stripes along a first direction and a plurality of second stripes along a second direction intersecting the first direction such that the intervals between the first stripes and the intervals between the second stripes are wider at a position further ahead of the vehicle than at a position closer to the vehicle in the traveling direction of the vehicle.

7. A vehicle headlight device comprising:
    a low-beam lamp and a high-beam lamp that emit light into a first light distribution region that is in front of a vehicle; and
    a patterned-light emitter that emits light into a second light distribution region in an illumination pattern in which bright regions and dark regions alternately repeat, the second light distribution region being further toward an outer side than the first light distribution region in a vehicle width direction, wherein
    the patterned-light emitter emits light such that intervals between the bright regions that are adjacent are wider at a position further ahead of the vehicle than at a position closer to the vehicle in a traveling direction of the vehicle,
    wherein the patterned-light emitter emits light such that widths of the bright regions are narrower at a position further ahead of the vehicle than at a position closer to the vehicle in the traveling direction of the vehicle.

* * * * *